Feb. 7, 1928.

A. W. HANIGAN

PISTON PACKING

Filed Nov. 20, 1926

1,658,440

INVENTOR.
ADAM W. HANIGAN
BY Parker & Burton
ATTORNEY.

Patented Feb. 7, 1928.

1,658,440

UNITED STATES PATENT OFFICE.

ADAM W. HANIGAN, OF DETROIT, MICHIGAN.

PISTON PACKING.

Application filed November 20, 1926. Serial No. 149,623.

My invention relates to improvements in piston packing.

The object is to provide an improved packing ring with overlapping ends adapted to prevent leakage at such point and so constructed and arranged that as the ring wears such meeting ends automatically adapt themselves to retain a tight joint at such point. An important feature resides in the provision of such a ring of split, expansible, one-piece type wherein that portion of the ring nearest the innermost meeting end is so formed as to present to the cylinder wall a wearing face of less area than that portion of the ring nearest the outermost meeting end.

Other important advantages and meritorious features of my invention will more fully appear from the following description of the embodiment thereof illustrated in the accompanying drawings and from the appended claims.

Figure 3:
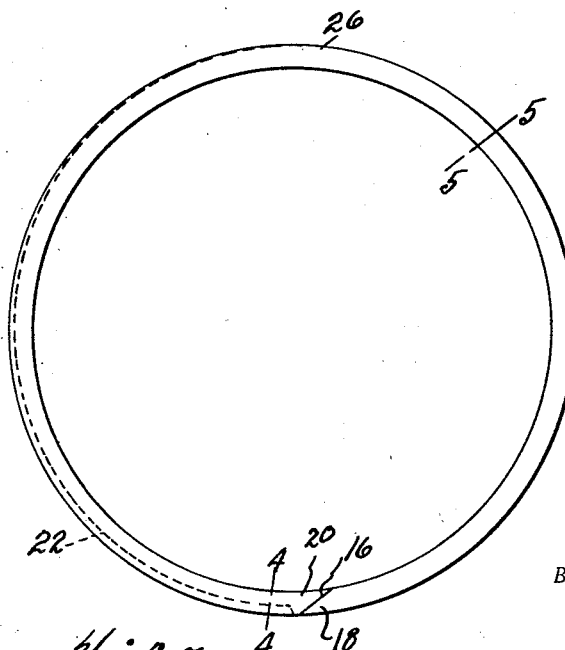
Fig. 3 is a plan view of the ring shown in Fig. 2.
Figure 4:
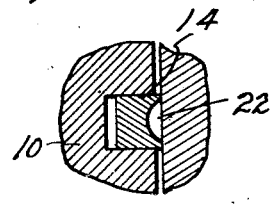
Figure 5:
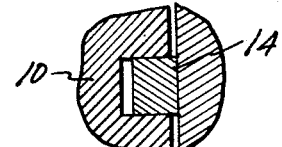

Figs. 4 and 5 are vertical sectional views taken on lines 4—4 and 5—5 of Fig. 3 respectively.

Figure 1:
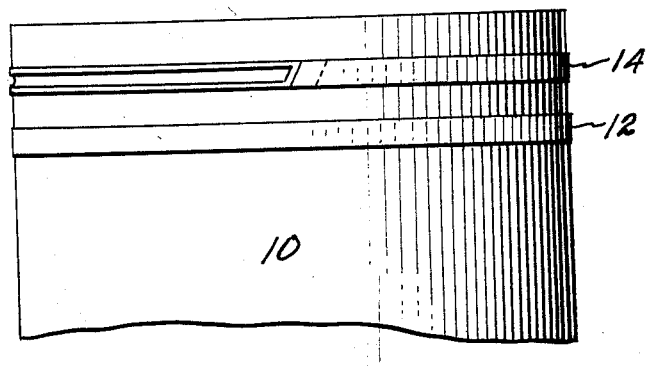
Fig. 1 is a fragmentary elevation of a piston provided with a ring embodying my invention.

In Fig. 1 of the drawing a piston of conventional design is illustrated in fragmentary elevation as 10. This piston is provided with a pair of packing ring grooves. Within one of the grooves is mounted a plain packing ring 12 and within the other groove is mounted my improved packing ring 14.

Figure 2:
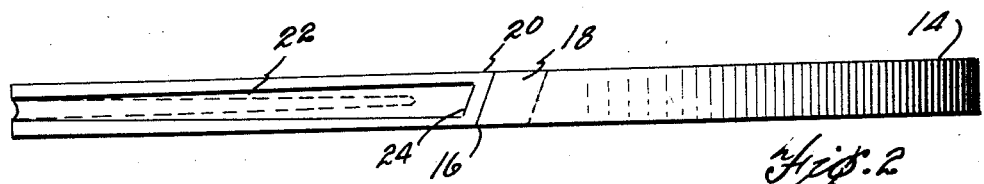
Fig. 2 is a side elevation of a piston ring embodying my invention.

My improved ring is here illustrated as a split, one-piece, expansible ring, the meeting ends of which are beveled as illustrated in the drawings so that one end overlaps the other. The split is cut on an angle radially and axially as appears at 16 in Figs. 2 and 3, so that the beveled end 18 of the ring overlaps the end 20 of the ring.

I prefer to form this ring in such a fashion that when initially installed in a groove in the piston there is a very slight clearance between the meeting ends of the ring which is closed upon expansion of the ring due to heat during the operation of the pistons. The purpose of my invention is primarily to insure a continued closing of this joint during continuation of use of the ring and the consequent wear thereof.

I provide a peripheral channel or groove 22 which is formed in that portion of the ring nearest the innermost meeting end 20. This channel preferably terminates at one end in proximity to but spaced from the end of the cylinder wall engaging face as at 24. The groove extends from the point circumferentially the ring to a point diametrically opposite as at 26. The channel has its deepest point at 24 and tapers therefrom to run out at the surface at 26. The channel also tapers axially of the ring to come to a point at 26. The groove therefore is eccentric to the ring so that that portion of the ring nearest the meeting end 20 will wear more rapidly than the portion of the ring furtherest therefrom. Due to the fact that the portion of the ring nearest the meeting end 20 is provided with a cylinder wall engaging face of less area than the portion of the ring nearest the meeting end 18, the wear of the ring will result in the innermost meeting end moving outwardly to maintain a close joint with the overlapping end 18.

What I claim is:

1. In piston packing, a split one-piece packing ring having beveled overlapping meeting ends, said ring provided with a peripheral eccentric channel terminating at one end in its point of greatest depth adjacent to but spaced from one end of the ring and terminating at the opposite end on the opposite side of the ring.

2. In piston packing, a split one-piece packing ring having beveled ends one of which overlaps the other, said ring provided upon that portion of its periphery terminating at the innermost beveled end with a groove extending from a point adjacent thereto but spaced therefrom, toward the opposite end of the ring but terminating a substantially greater distance therefrom than from the first mentioned end of the ring.

3. In piston packing, a split one-piece packing ring having beveled ends one of which overlaps the other, said ring provided upon that portion of its periphery terminating at the innermost beveled end with a groove extending from a point adjacent thereto but spaced therefrom, toward the opposite end of the ring to a point approximately midway the circumference of the ring.

4. In piston packing, a split one-piece packing ring having beveled overlapping meeting ends, said ring provided with a peripheral groove terminating at one end in proximity to the innermost beveled end of the ring and the opposite end approximately 180° therefrom.

5. In piston packing, a split one-piece packing ring having beveled overlapping meeting ends, said ring provided with a peripheral groove terminating at one end in proximity to the innermost beveled end of the ring and the opposite end approximately 180° therefrom, said groove being eccentric with respect to the ring and having its deepest part adjacent to the end thereof.

6. In piston packing, a split one-piece packing ring having beveled overlapping meeting ends, that portion of the ring adjacent to its innermost beveled end being cut away on its cylinder wall engaging face to present to the wall of the cylinder a face of substantially less area than that portion of the ring adjacent the outermost beveled end.

7. In piston packing, a packing ring provided with overlapping meeting ends, that portion of the ring nearest the innermost meeting end being relieved so as to present an outer face of substantially less area than that portion of the ring nearest the outermost meeting end, said ring being so formed that such outer face increases in area from said innermost meeting end gradually to a point substantially remote from such end.

8. In piston packing, a one-piece split expansible packing ring, having axially and radially overlapping meeting ends, said ring provided with a peripheral groove formed in that portion nearest its innermost meeting end, which groove extends from a point adjacent thereto but spaced therefrom toward the opposite end of the ring and terminates a substantially greater distance therefrom, whereby that portion of the ring nearest the innermost meeting end has an outer face of substantially less area than the portion nearest the outermost meeting end.

9. In piston packing, a one-piece split expansible packing ring, having axially and radially overlapping meeting ends, said ring provided with a peripheral groove formed in that portion nearest its innermost meeting end, which groove extends from a point adjacent thereto but spaced therefrom toward the opposite end of the ring and terminates a substantially greater distance therefrom, said groove being eccentric axially and radially with respect to the ring.

In testimony whereof, I, ADAM W. HANIGAN, sign this specification.

ADAM W. HANIGAN.